(12) United States Patent
Behzad et al.

(10) Patent No.: US 7,856,215 B2
(45) Date of Patent: Dec. 21, 2010

(54) METHOD AND SYSTEM FOR USING A MULTI-RF INPUT RECEIVER FOR DIVERSITY SELECTION

(75) Inventors: Arya Behzad, Poway, CA (US); Ali Afsahi, San Diego, CA (US); Mark Gonikberg, Los Altos Hills, CA (US)

(73) Assignee: Broadcom Corp.

( * ) Notice: Subject to any disclaimer, the term of this patent is extended or adjusted under 35 U.S.C. 154(b) by 782 days.

(21) Appl. No.: 11/618,808

(22) Filed: Dec. 30, 2006

(65) Prior Publication Data
US 2008/0139154 A1 Jun. 12, 2008

Related U.S. Application Data

(60) Provisional application No. 60/868,818, filed on Dec. 6, 2006.

(51) Int. Cl.
H04B 17/00 (2006.01)
H04B 17/02 (2006.01)
H04B 1/06 (2006.01)
H04B 7/00 (2006.01)

(52) U.S. Cl. .............. 455/130; 455/67.11; 455/134; 455/226.2; 455/276.1

(58) Field of Classification Search ......... 455/132–135, 455/139–140, 272, 275–277.2, 67.11, 67.13, 455/226.1–226.3; 375/347
See application file for complete search history.

(56) References Cited

U.S. PATENT DOCUMENTS

| | | | | |
|---|---|---|---|---|
| 5,325,403 A | * | 6/1994 | Siwiak et al. ............... | 375/347 |
| 5,757,866 A | * | 5/1998 | Kannari et al. .............. | 375/347 |
| 5,761,252 A | * | 6/1998 | Iinuma ........................ | 375/347 |
| 5,953,383 A | * | 9/1999 | Kojima ........................ | 375/347 |
| 6,018,647 A | * | 1/2000 | Fitzgerald .................... | 455/135 |
| 6,249,249 B1 | * | 6/2001 | Obayashi et al. ............. | 342/371 |
| 6,400,318 B1 | * | 6/2002 | Kasami et al. ............... | 342/383 |
| 7,006,809 B2 | * | 2/2006 | Petrov et al. ............... | 455/276.1 |
| 7,117,017 B2 | * | 10/2006 | Chen et al. ................ | 455/562.1 |
| 7,369,832 B2 | * | 5/2008 | Cho ......................... | 455/276.1 |
| 7,426,232 B2 | * | 9/2008 | Matsuoka et al. ............ | 375/148 |
| 2006/0111056 A1 | * | 5/2006 | Dutta .......................... | 455/103 |
| 2007/0037529 A1 | * | 2/2007 | Nagai et al. ................. | 455/101 |
| 2008/0004078 A1 | * | 1/2008 | Barratt et al. ............. | 455/562.1 |

* cited by examiner

*Primary Examiner*—Simon D Nguyen
(74) *Attorney, Agent, or Firm*—McAndrews, Held & Malloy, Ltd.

(57) ABSTRACT

Aspects of a method and system for signal processing are disclosed and may include receiving a plurality of wireless signals via a plurality of M receive antennas. Each of M phase shifters coupled to each of the M receive antennas may be set to operate in a bypass mode or with an arbitrary phase setting. Corresponding signal strengths of M signals generated when each of the M phase-shifters is coupled to each of the M receive antennas may be measured, while at least a portion of the M receive antennas are turned off. Selecting one of the M generated signals for processing without the use of an antenna switch, based on the measured signal strength. A signal strength of each of the generated M amplified signals may be measured while turning off at least one of the plurality of M receive antennas and without the use of the phase-shifters.

28 Claims, 13 Drawing Sheets

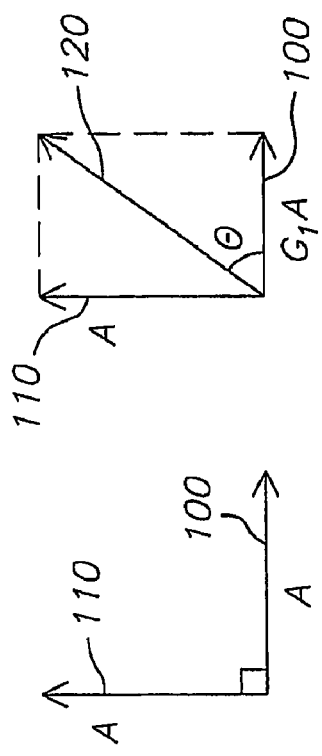
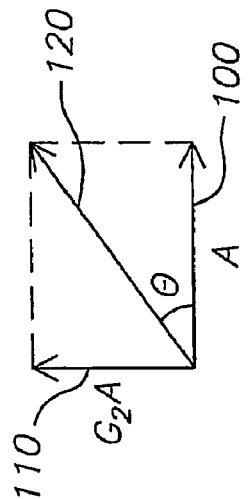
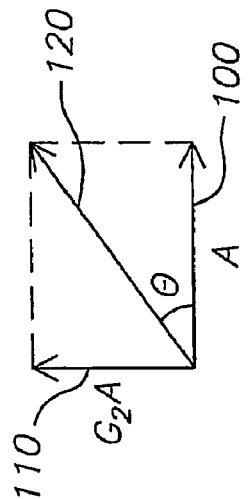
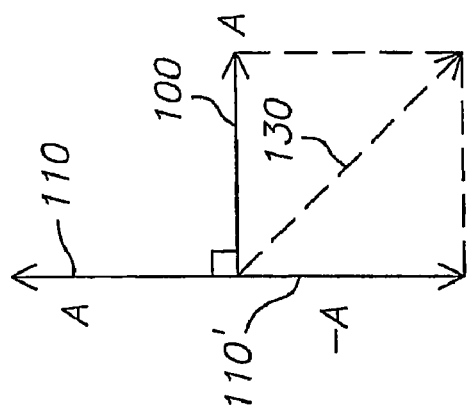
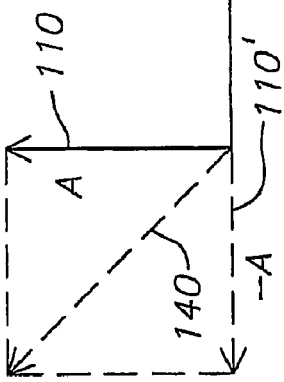
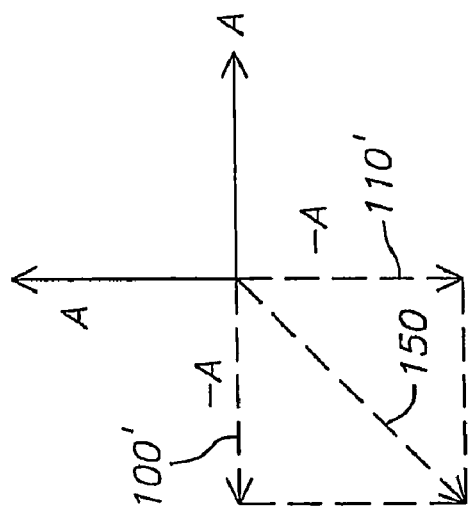

METHOD AND SYSTEM FOR USING A MULTI-RF INPUT RECEIVER FOR DIVERSITY SELECTION

CROSS-REFERENCE TO RELATED APPLICATIONS/INCORPORATION BY REFERENCE

Not Applicable

FIELD OF THE INVENTION

Certain embodiments of the invention relate to signal processing. More specifically, certain embodiments of the invention relate to a method and system for using a multi-RF input receiver for diversity selection.

BACKGROUND OF THE INVENTION

Electronic devices can now communicate with each other using a variety of wireless communication systems, such as wireless local area network (WLAN) systems, 802.11 network systems, Wi-Fi network systems, etc. Demands for higher data rate wireless communication are increasing day to day and it is becoming difficult to achieve further improvement in spectral efficiency using only time and/or frequency domain methods.

Multiple antenna systems are known to be an efficient solution to increase data rate and/or increase robustness by taking advantage of multi-path scattering present in most indoor and urban environments. Phase shifters (PS) are used to set the phase of the received signal from each antenna. These radio frequency (RF) phase shifters have to meet certain requirements, such as having adjustable phase with the range of 360 degrees, having low loss and control complexity, consuming low power, and/or being compact and low cost to be able to be used in commercial applications. As such, it would be desirable to provide a phase shifter (e.g., an RF phase shifter) that has a high shift range, a small size, a low cost, and/or a low power consumption.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for using a multi-RF input receiver for diversity selection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 1A, 1B, 1C, 1D, 1E, and 1F illustrate two perpendicular vectors with variable amplitudes according to certain aspects of the present invention.

DETAILED DESCRIPTION OF THE INVENTION

Figure 2:
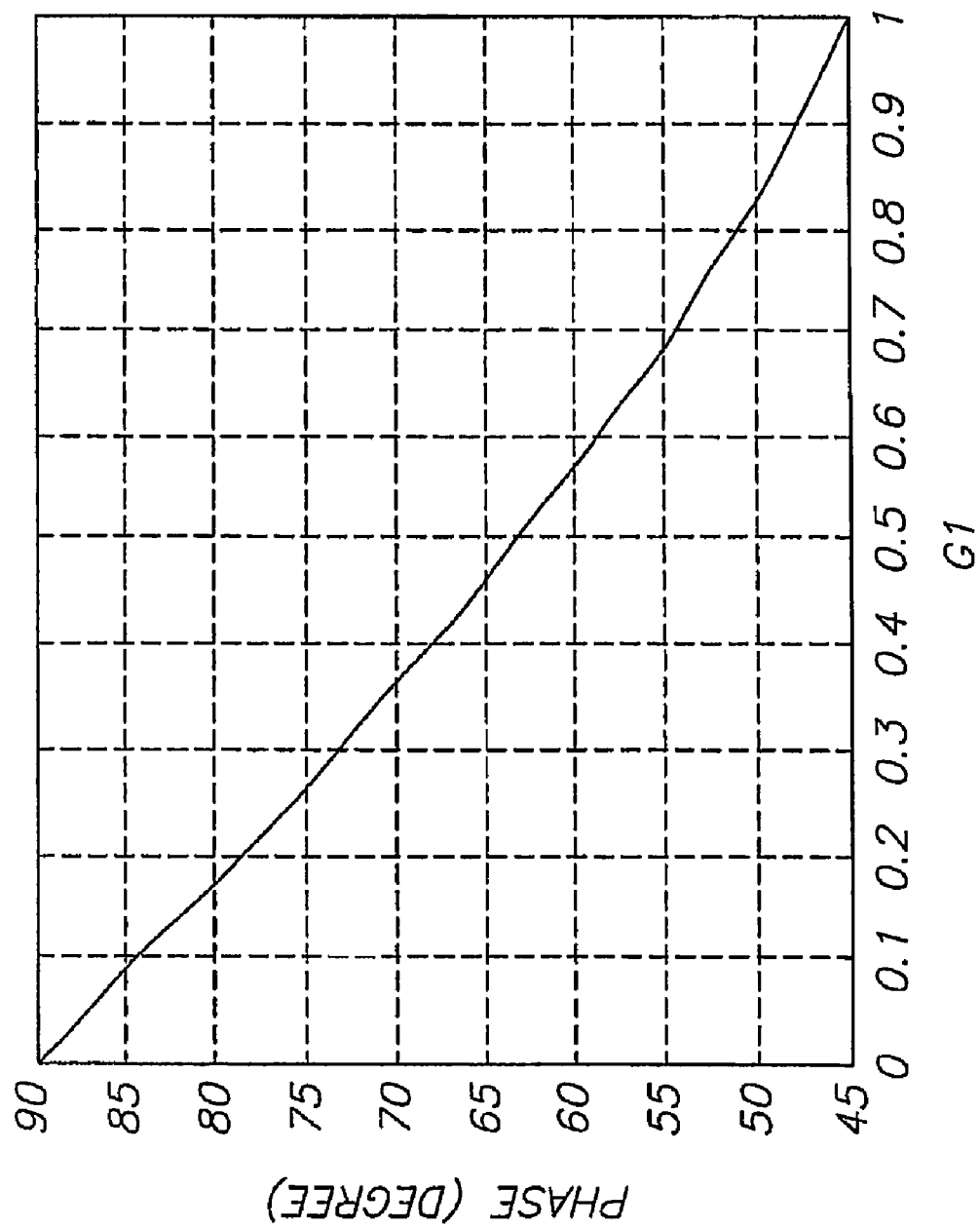
FIG. 2 illustrates a variation of a phase versus a gain of a vector according to certain aspects of the present invention.

Certain embodiments of the invention may be found in a method and system for using a multi-RF input receiver for diversity selection. Aspects of the method may comprise receiving a plurality of wireless signals via a plurality of M receive antennas. Each of M phase shifters coupled to each of the M receive antennas may be set to operate in a bypass mode or with an arbitrary phase setting. Corresponding signal strengths of M signals generated when each of the M phase-shifters is coupled to each of the M receive antennas may be measured, while at least a portion of the M receive antennas are turned off. Selecting one of the M generated signals for processing without the use of an antenna switch, based on the measured signal strength. Aspect of the method may also include receiving a plurality of wireless signals via a plurality of M receive antennas. Each of the plurality of wireless signals received via the plurality of M receive antennas may be amplified to generate M amplified signals. A signal strength of each of the generated M amplified signals may be measured while turning off at least a portion of the plurality of M receive antennas. Selecting one of the M amplified signals for processing without the use of an antenna switch, based on the measured signal strength of each of the generated M amplified signals.

An exemplary embodiment of the present invention provides a phase shifter that is high in shift range, small in size, low in cost, high in performance, and/or low in power consumption. Signals of a RF phase shifter can be described in terms of one or more sinusoidal waveforms. For example, in a simple electronic-circuit application, a signal (e.g., a current or a voltage) can be varied sinusoidally as a function of time as represented below:

$$I(t) = A \sin(2\pi f t + \theta),$$

where A is the amplitude, f is the frequency, and θ is the phase angle with respect to some arbitrary phase angle. More specifically, the amplitude A is related to a peak signal value (e.g., a peak current or voltage) of the sinusoidal wave, the frequency f is related to the inverse of a period T of the wave, and the phase angle θ is the phase angle of the wave with respect to a phase reference. The phase reference can be chosen arbitrarily to define the initial value of the phase angle θ at the input to a RF phase shifter or RF phase shifting circuit.

In general, a phase angle θ is used to measure the progression of a periodic wave in time or space from a chosen instant or position. That is, the phase angle θ of the periodic wave having the frequency f, which corresponds to the period T, is the fractional part (t/T) of the period T through which t has shifted relative to an arbitrary origin or phase reference.

To simplify the following description, a phasor or vector concept is used to represent a sinusoidal wave. As is known to those skilled in the art, a phasor or a vector represents a particular complex number that contains information about a sinusoidal wave's amplitude A and phase angle θ.

Referring now to FIGS. 1A to 1F, a concept of the present invention is to add two perpendicular vectors with variable amplitudes A together to represent a third vector. As is shown in FIG. 1A and assuming a constant frequency f is applied to two sinusoidal waves, the two waves can be represented by vectors 100, 110. As are shown in FIGS. 1B to 1C, by changing the amplitude A (e.g., by varying a gain) and adding these two vectors 100, 110, a third vector 120 having any phase angle θ between 0 and 90 degrees is achievable. In particular, by changing a first gain G1 of the vector 100 from 0 to 1, the phase angle θ of the third vector 120 will change from 90 degrees to 45 degrees and by changing a second gain G2 from 1 to 0, the phase angle (or phase) of the third vector 100 will change from 45 degrees to 0 degrees.

FIGS. 1D to 1F show exemplary embodiments {e.g., using inversely connected phase shifter components) to provide a negative vector 100' and/or a negative vector 110'. In particular, the addition of the positive vector 100 and the negative vector 110' results in a vector 130 as schematically indicated in FIG. 1D. The addition of the positive vector 110 and the negative vector 110' results in a vector 140 in FIG. 1E and the addition of the negative vector 100' and the negative vector 110' results in a vector 150 in FIG. 1F. As such, referring now to FIGS. 1A to 1F, by changing a gain of the vectors 100, 110, 100', and/or 110' from 0 to 1, the phase angle θ of the resultant vector (e.g., 120, 130, 140, 150, etc) can change from 0 to 360 degrees.

FIG. 2 shows the variation of the phase angle (or phase) θ (in degree) versus the first gain G1 of the vector 100. As is shown in FIG. 2, the phase angle θ (in a substantially linear fashion) increases as the first gain G1 decreases and decreases as the first gain G1 increases.

As envisioned, an embodiment of the present invention is a phase shifter or an active RF phase shifter that is designed to produce the phase shift effects required for the operation of certain antenna systems or multiple antenna systems. The phase shifter can include non-silicon based technologies (e.g., technologies using gallium-arsenide (GaAs) MOSFET) and/or be implemented in CMOS.

In particular, an embodiment of the present invention uses two 90 degree phase shift signals and/or a simple RC-CR circuit with gain control to generate the vectors of FIGS. 1A to 1F to produce a 360 degree phase shift.

In addition, an embodiment of the present invention is an active phase shifter and/or uses transistors to perform amplitude (or gain) control rather then using a pure passive solution. As such, the size and cost of the embodiment of the present invention can be substantially less than a 360 degree phase shifter using an inductor and/or a passive phase shifter.

Figure 3A:
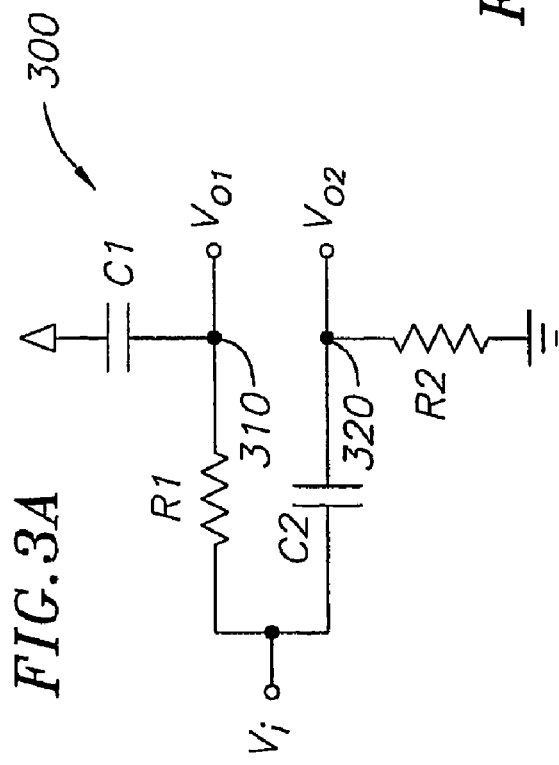
FIGS. 3A and 3B illustrate a phase shifter having an RC-CR circuit according to certain embodiments of the present invention.

Referring now to FIG. 3A, a phase shifter according to an exemplary embodiment of the present invention is provided. The phase shifter of FIG. 3A is a 90 degree phase shifter where the RC-CR network 300 shown in FIG. 3A is used. The RC-CR network 300 can be used as a broadband 90 degree phase shifter. The RC-CR network 300 includes an input Vi, first and second outputs Vo1, Vo2, first and second capacitors C1, C2, and first and second resistors R1, R2. The input Vi is connected to a ground voltage via the first resistor R1 and the first capacitor C1 in that order, and the first output Vo1 is connected to a first connection node 310 between the first resistor R1 and the first capacitor C1. In addition, the input Vi is connected to the ground via the second capacitor C2 and the second resistor R2 in that order, and the output Vo1 is connected to a second connection node 310 between the second capacitor C2 and the second resistor R2.

In operation, when the input (or input voltage) Vi is applied to the RC-CR network 300, the first and second outputs (or output voltages) Vo1, Vo2 are outputted with a 90 degree difference in phase (or phase angle). That is, the output $Vo_1$ and the output Vo2 are given as follow:

$$Vo_1 = \frac{\frac{1}{C_1 s} Vi}{R + \frac{1}{C_1 s}} = \frac{1}{1 + R_1 C_1 s} Vi$$

$$Vo_2 = \frac{R_2 Vi}{R_2 + \frac{1}{C_2 s}} = \frac{R_2 C_2 s}{1 + R_2 C_2 s} Vi$$

where Vi represent voltage of the input Vi; $Vo_1$ and $Vo_2$ respectively represent voltage of the first and second outputs $Vo_1$, $Vo_2$; $R_1$ and $R_2$ respectively represent resistance of the first and second resistors $R_1$, $R_2$; $C_1$ and $C_2$ respectively represent capacitance of the first and second capacitors $C_1$, C2; and s represent the complex frequency. Since s=jω and ω=2πf the output $Vo_1$ and the output $Vo_2$ can also be given as follow:

$$Vo_1 = \frac{1}{1 + R_1 C_1 j\omega} V_i$$

$$Vo_2 = \frac{R_2 C_2 j\omega}{1 + R_2 C_2 j\omega} V_i$$

As such, the phase (or phase angle) of the first output Vo1 and the phase of the second output Vo2 are given as follow:

$$<Vo_1 = <Vi - \tan^{-1} \frac{R_1 C_1 \omega}{1}$$

$$<Vo_2 = <Vi + \frac{\Pi}{2} - \tan^{-1} R_2 C_2 \omega$$

where $<Vo_1$ and $<Vo_2$ respectively represent the phase of the outputs $Vo_1$, Vo2; and <Vi represents the phase of the input Vi. Thus, if $R_1=R_2$ and $C_1=C_2$, the phase difference of the outputs $Vo_1$, Vo2 (i.e., <Vo1−<Vo2) is equal to π/2 or 90 degrees. Also, at ω=1/$R_1 C_1$ (or 1/$R_2 C_2$), the amplitudes of the output $Vo_1$ and the output Vo2 are equal.

Figure 3B:
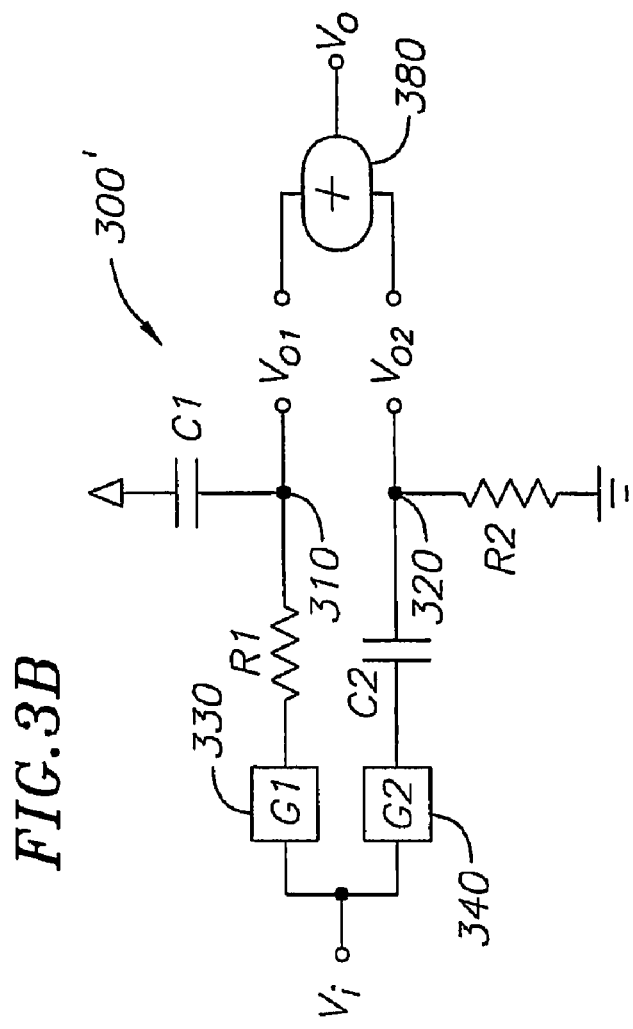

Referring now to FIG. 3B, a phase shifter according to an exemplary embodiment of the present invention is provided. The phase shifter of FIG. 3B is substantially similar to the 90 degree phase shifter of FIG. 3A with the addition of first and second gain controllers 330, 340 and an adder 380. Specifically, the phase shifter of FIG. 3B uses an RC-CR network 300' shown in FIG. 3B. The RC-CR network 300' of FIG. 3B is substantially similar to the RC-CR network 300 of FIG. 3A with the addition of the first gain controller 330 being connected to the first connection node 310 via the first resistor R1, the second gain controller 340 being connected to the second connection node 320 via the second capacitor $C_2$, and the adder 380 being connected to the outputs $Vo_1$, $Vo2$.

In operation, when the input (or input voltage) Vi is applied to the RC-CR network 300' and when no gains are provided by the first and second gain controllers 330, 340 (or gains are equal), the first and second outputs (or output voltages) $Vo_1$, Vo2 are outputted with a 90 degree difference in phase (or phase angle) and equal in amplitude at $\omega=1/R_1C_1$ (or $1/R_2C_2$). In this case, the output Vo of the adder is outputted with a signal having a 45 degree difference in phase (or phase angle) with respect to the first output $Vo_1$ or the second output Vo2 (e.g., see FIG. 1B). Moreover, by selectively changing the gain of the first and/or second gain controllers 330, 340, other desired phase or phase angle θ can be generated at the output Vo of the adder 380 (e.g., see FIG. 1C).

Figure 4:
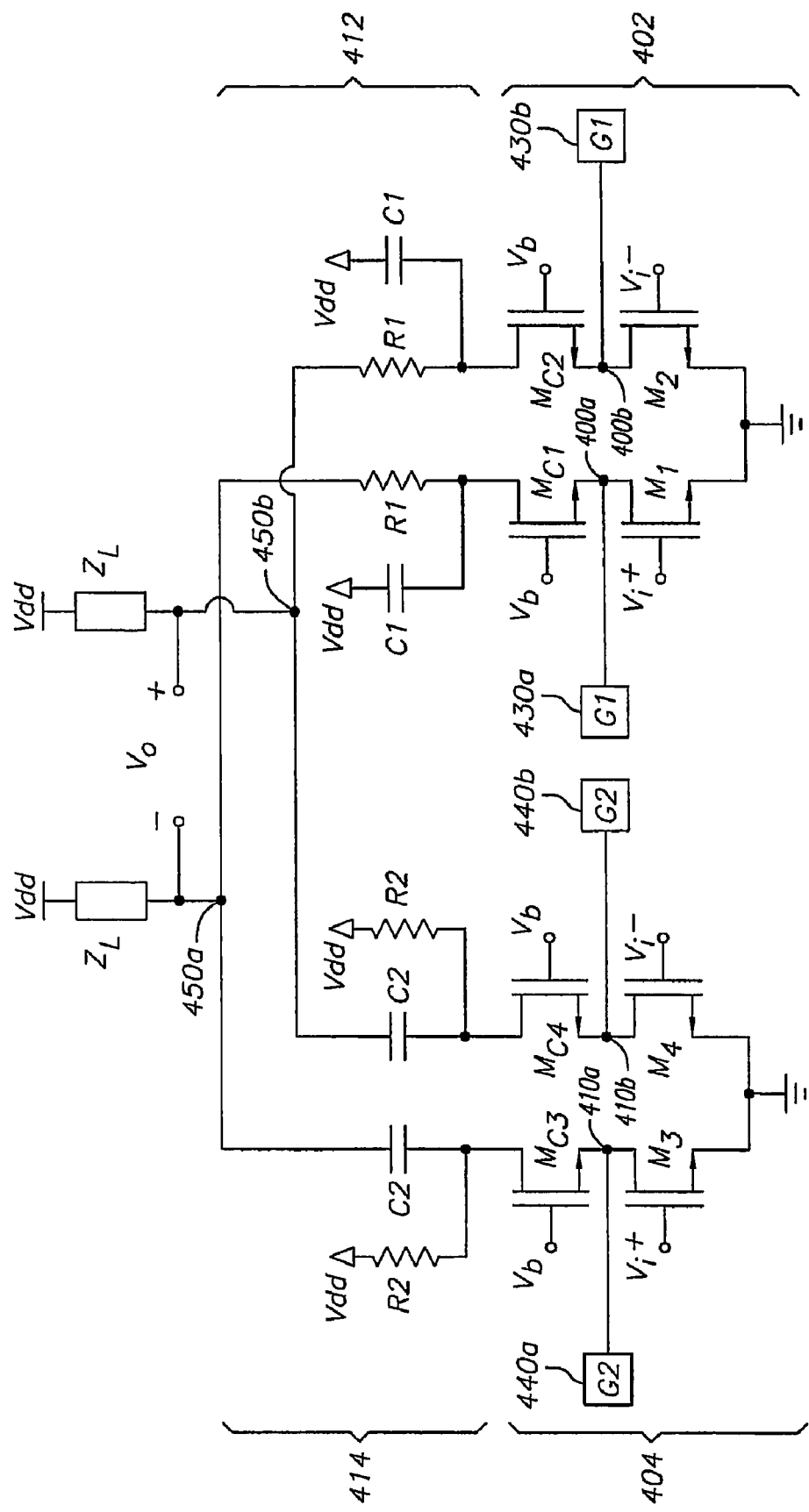
FIG. 4 illustrates a differential phase shifter according to an embodiment of the present invention.

FIG. 4 shows a differential circuit embodiment of the present invention. First and second differential pairs 402, 404 include differential inputs $V_i^+$, $V_i^-$ that are fed from an output of a previous stage (not shown). The first and second differential pairs 402, 404 convert voltage to current. By passing the currents through the RC-CR circuit pairs 412, 414, the 90 degree phase shifted signals are generated and they are added with each other in adders 450a, 450b to give the final signal (or final output voltage). By changing the gain of each of the first and second differential pairs 402, 404, via the gain controllers 430a, 430b, 440a, 440b, the desired phase or phase angle θ can be generated at the output of the adder 450a, 450b. To get 360 degree phase shifting, the embodiment of FIG. 4 just needs to change the polarity of the input of the differential pairs 402, 404.

In more detail, loads $Z_L$ are coupled to the first and second differential pairs 402, 404 via the adders 450a, 450b. The first and second differential pairs 402, 404 include cascoded transistor pairs having NMOS FETS (e.g. $M_{c1}$ and $M_1$) serially coupled together such that the source of a cascode transistor (e.g. NMOS FET $M_{c1}$) is coupled to the drain of a transconductance transistor (e.g. NMOS FET $M_1$) via a connection-control node (e.g., 400a). In addition, a gain controller 430a, 430b, 440a, 440b is respectively coupled to each connection-control node 400a, 400b, 410a, 410b. In this embodiment, at least one of differential input voltages $V_i^+$, $V_i^-$ is coupled to each of the transconductance transistors ($M_1$-$M_4$) of the first and second differential pairs 402, 404. The transconductance transistors ($M_1$-$M_4$) are for changing voltage(s) into current (s). Further, the cascode transistors ($M_{c1}$-$M_{c4}$) of the first and second differential pairs 402, 404 are, by way of example, coupled to control voltages Vb. The cascode transistors ($M_{c1}$-$M_{c4}$) are for impedance balancing, gain control assisting, increasing output impedance, reducing an effective capacitance input, and/or improving linearity.

In operation, the first differential pair 402 converts a differential input voltage into a first differential current as a function of an input voltage $Vi^+$, $Vi^-$. In addition, the gain controllers 430a, 430b via the connection-control nodes 400a, 400b control a gain of the first differential current. In a similar manner, the second differential pair 404 controls the output current and gain of the second differential pair 404. For example, the gain controllers 440a, 440b via the connection-control nodes 410a, 410b control a gain of a second differential current after the second differential pair 404 current converts a second differential input voltage into the second differential current in accordance with the input voltage $Vi^+$, $Vi^-$. As such, by passing the currents outputted from the first and second differential pairs 402, 404 through the RC-CR network pairs 412, 414, the 90 degree phase shifted signals are generated and they are added up in the adders 450a, 450b (and/or the loads $Z_L$) to give the final signal. In addition, by changing the gain of the each of the first and second differential pairs 402, 404 via the gain controllers 430a, 430b, 440a, 440b, the desired phase or phase angle θ can be generated after adding the two currents. To get 360 degree phase shifting, the embodiment of FIG. 4 just needs to change the polarity of the currents initially generated by one or both of the differential pairs 402, 404.

Figure 5A:
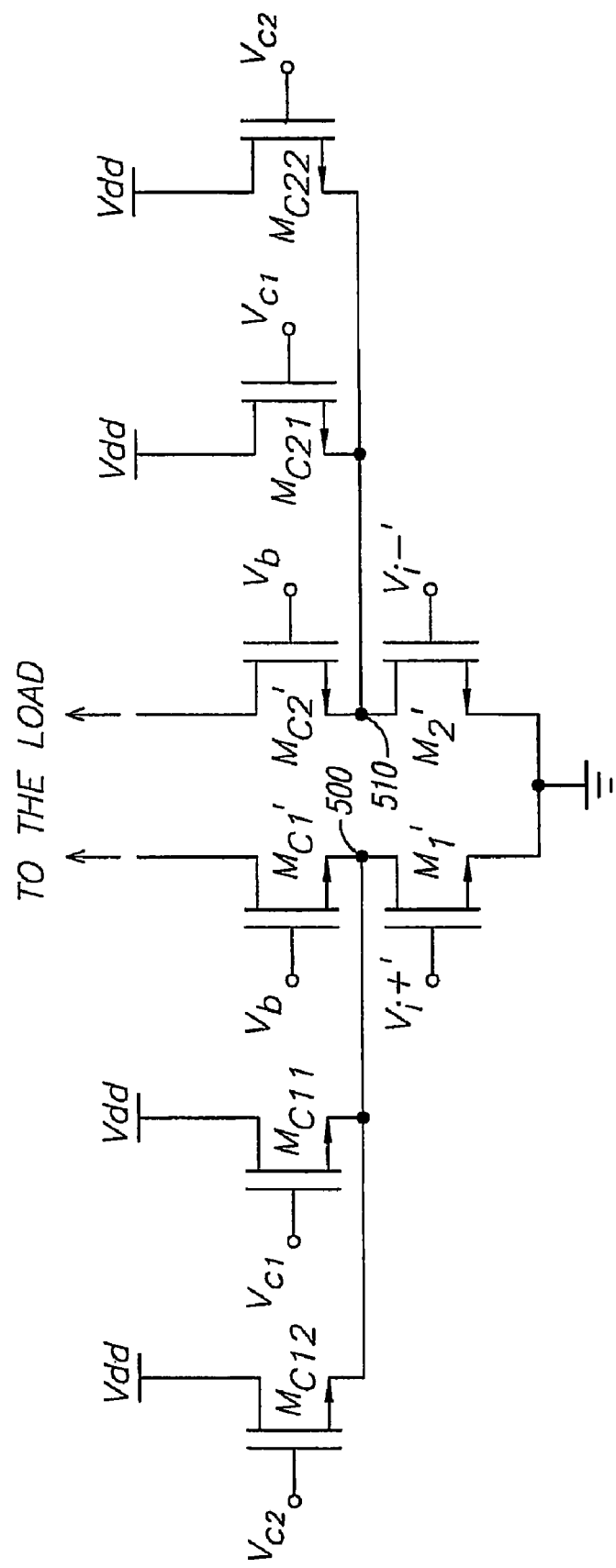
FIGS. 5A and 5B illustrate gain control components and/or polarity control components according to certain embodiments of the present invention.

Referring now to FIG. 5A, a gain of a phase shifter in one embodiment of the present invention is varied by controlling an amount of a current that passes through a load. In particular, the embodiment of FIG. 5A includes first and second transconductance transistors $M_1'$, $M_2'$ for converting voltage to current and first and second cascode transistors $M_{c1}'$, $M_{c2}'$. The first and second cascode transistors $M_{c1}'$, $M_{c2}'$ are coupled to the first and second transconductance transistors $M_1'$, $M_2'$ via first and second connection-control nodes 500, 510 such that the source of a cascode transistor (e.g. NMOS FET $M_{c1}'$) is coupled to the drain of a transconductance transistor (e.g. NMOS FET $M_1'$). In addition, the first connection-control node 500 is coupled to one or more control transistors $M_{c11}$, $M_{c12}$ such that the source of each control transistor (e.g. NMOS FET $M_{c11}$ or NMOS FET $M_{c12}$) is coupled to the drain of the first transconductance transistor $M_1'$. The second connection-control node 510 is coupled to one or more other control transistors $M_{c21}$, $M_{c22}$ such that the source of each control transistor (e.g. NMOS FET $M_{c21}$ or NMOS FET $M_{c22}$) is coupled to the drain of the second transconductance transistor $M_2'$. In this embodiment, at least one of the input voltages $V_i^{+\prime}$, $V_i^{-\prime}$ is coupled to each of the transconductance transistors ($M_1'$, $M_2'$) and the cascode transistors ($M_{c1}'$, $M_{c2}'$) are coupled to cascode control voltage $V_b$. Further, the control transistors ($M_{c11}$, $M_{c12}$, $M_{c22}$, $M_{c22}$) of the first and second connection-control nodes 500, 510 are individually coupled to separate control voltages Vc1, Vc2 respectively.

In operation, when the control voltages Vc1, Vc2 are both low, all of the current (i.e., the desired signal) goes to the load. However, when one or both of the control voltages Vc1, Vc2 are high, some portion of the current goes to the load and the rest goes to a voltage $V_{DD}$ or a ground voltage. As such, by defining a size (e.g., an aspect ratio) of the control transistors ($M_{c11}$, $M_{c12}$, $M_{c21}$, $M_{c22}$) and/or the control voltages Vc1, Vc2, the embodiment can adjust how much current goes to the load via the cascode transistors ($M_{c1}'$, $M_{c2}'$) to thereby provide a variable and controllable gain.

Figure 5B:
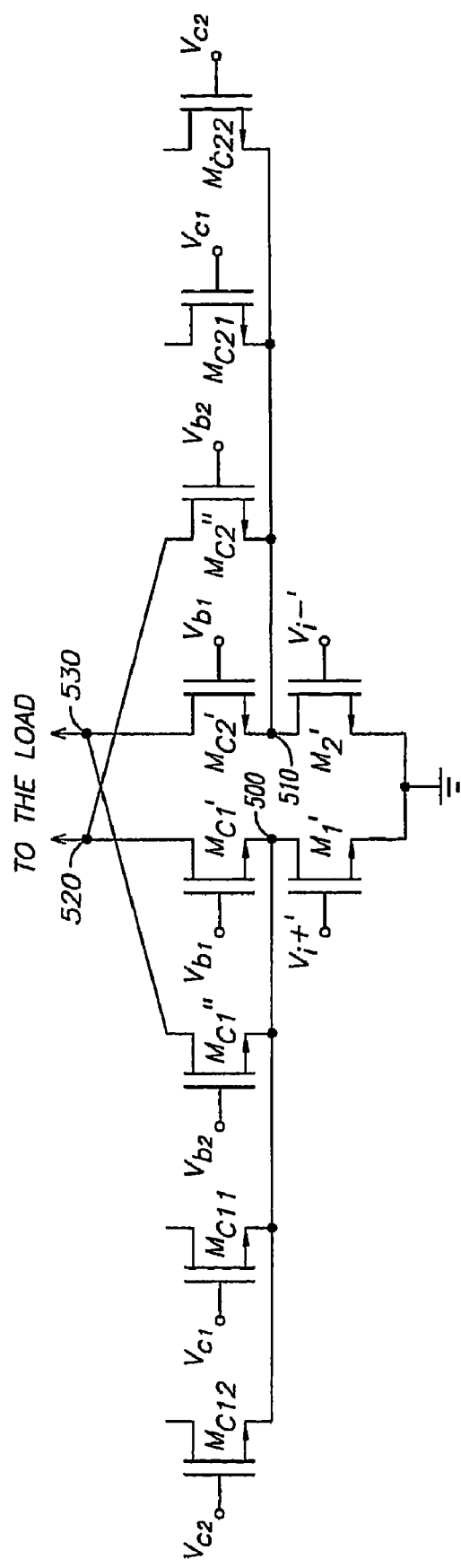

Referring now to FIG. 5B, to get 360 degree phase shifting, an embodiment of the present invention provides third and fourth cascode transistors ($M_{c1}''$, $M_{c2}''$) to change the polarity of the currents initially generated by a differential pair (e.g., the differential pair 402, 404 of FIG. 4).

As shown, the embodiment of FIG. 5B is substantially similar to the gain varying embodiment of FIG. 5A with the addition of the third and fourth cascode transistors ($M_{c1}''$, $M_{c2}''$). In particular, the first and second cascode transistors $M_{c1}'$, $M_{c2}'$ are coupled to the first and second transconductance transistors $M_1'$, $M_2'$ via first and second connection-control nodes 500, 510 such that the source of a cascode transistor (e.g. NMOS FET $M_{c1}'$) is coupled to the drain of a transconductance transistor (e.g. NMOS FET $M_1$). Similarly, the third and fourth cascode transistors $M_{c1}''$, $M_{c2}''$ are also coupled to the first and second transconductance transistors $M_1'$, $M_2'$ via the first and second connection-control nodes 500, 510 such that the source of a cascode transistor (e.g. NMOS FET $M_{c1}''$) is coupled to the drain of a transconductance transistor (e.g. NMOS FET $M_1'$). However, to provide the polarity change, the drain of the first cascode transistor $M_{c1}'$ is coupled to the first polarity-control node 520; the drain of the second cascode transistor $M_{c2}'$ is coupled to the second polarity-control node 530; the drain of the third cascode transistor $M_{c1}''$ is coupled to the second polarity-control node 530; and the drain of the fourth cascode transistor $M_{c2}''$ is coupled to the first polarity-control node 520. In this embodiment, the first and second cascode transistors ($M_{c1}'$, $M_{c2}'$) are coupled to cascode control voltage $V_{b1}$ and the third and fourth cascode transistors ($M_{c1}''$, $M_{c2}''$) are coupled to cascode control voltage $V_{b2}$.

In operation, the embodiment of FIG. 5B provides a first polarity using the first and second cascode transistors ($M_{c1}'$, $M_{c2}'$) and provides a second polarity using the third and fourth cascode transistors ($M_{c1}''$, $M_{c2}''$). That is, in this embodiment, the first polarity is provided when $V_{b2}$ is low and $V_{b1}$ is high and the second polarity is provided when $V_{b2}$ is high and $V_{b1}$ is low.

Referring back to FIG. 4, each of the first and second differential pairs 402, 404 may include the gain control components and/or polarity control components of FIGS. 5A and/or 5B to provide a variable and controllable gain and/or to change a polarity of an input voltage. In one embodiment, the components for varying the gain of each of the first and second differential pairs 402, 404 are controlled separately (i.e., with control voltages Vc1, Vc2 for one differential pair 402, and different control voltages for another differential pair 404) in a manner that is substantially similar to how the first and second cascode transistors ($M_{c1}'$-$M_{c2}'$) and the third and fourth cascode transistors ($M_{c1}''$-$M_{c2}''$) of FIG. 5B are individually coupled to separate cascode control voltages Vb1 and Vb2. As such, the gain of the first and second differential pairs 402, 404 can be individually controlled by changing the logic level (i.e., switching between high and low logic level) of the separate control voltages.

Figure 6:
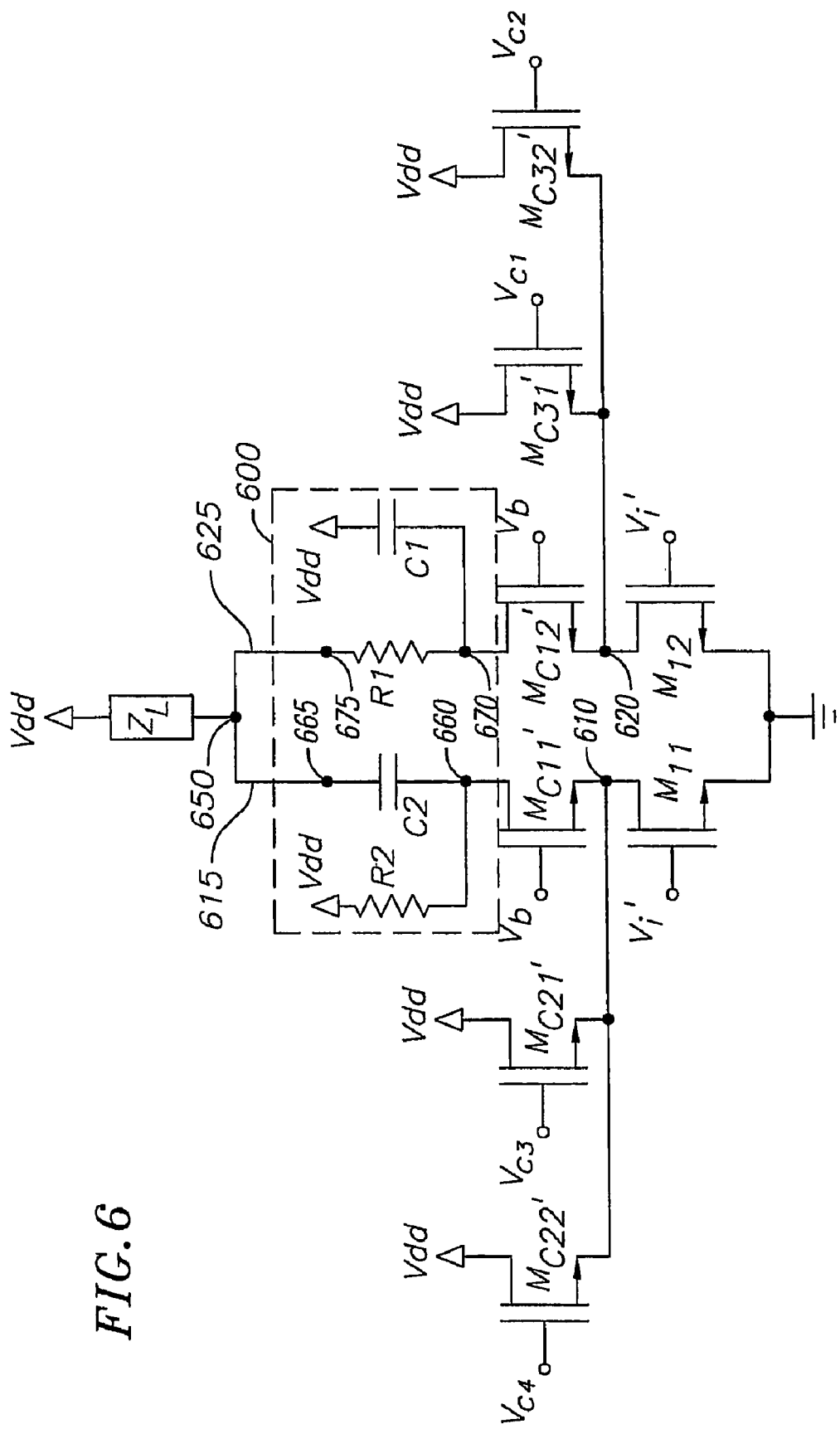
FIG. 6 illustrates a non-differential phase shifter according to an embodiment of the present invention.

One of skill in the art will appreciate that the invention is applicable to differential and/or non-differential implementations. For example, FIG. 6 shows a non-differential circuit embodiment of the present invention. The embodiment of FIG. 6 includes a load $Z_L$ coupled to an RC-CR circuit 600 via an adder 650. The RC-CR circuit 600 includes a capacitor C2 having a first capacitor node 660 and a second capacitor node 665 and a resistor R2 coupled between the first capacitor node 660 and a ground or a voltage Vdd. The RC-CR circuit 600 also includes a resistor R1 having a first resistor node 670 and a second resistor node 675 and a capacitor C1 coupled between the first resistor node 670 and the ground or the voltage Vdd. Cascode transistors $M_{c11}'$, $M_{c12}'$ are respectively coupled transconductance transistors $M_{c11}''$, $M_{12}$ via connection-control nodes 610, 620. In addition, control transistors $M_{c31}$), $M_{C32}'$ are coupled to the connection-control node 620 and control transistor $M_{c21}'$ and $M_{c22}'$ are coupled to the connection-control node 610. In this embodiment, an input voltage $V_1'$ is coupled to each of the transconductance transistors ($M_{11}$-$M_{12}$). The transconductance transistors ($M_{11}'$-$M_{12}'$) are for changing voltage(s) into current(s). The cascode transistors ($M_{c11}'$-$M_{c12}'$) are coupled to control voltages Vb. The cascode transistors ($M_{c11}'$-$M_{c12}'$) are for impedance balancing, reducing an effective capacitance input, gain control assisting, increasing output impedance, and/or improving linearity. Moreover, the control transistors $M_{c31}'$, $M_{C32}'$, $M_{c21}'$, $M_{c22}'$ are each respectively coupled to a control voltage Vc1, Vc2, Vc3, Vc4. The control transistors $M_{c31}'$, $M_{C32}'$, $M_{c21}'$, $M_{c22}'$ are for controlling a gain of the RC-CR circuit 600. As shown, the gain on each arm 615, 625 of the present embodiment can be individually controlled by individually changing the logic level (i.e., switching between high and low logic level) of the separate control voltages Vc1, Vc2, Vc3, Vc4.

An exemplary phase shifter of the present invention may be integrated into any of a variety of RF circuit applications and/or wireless systems to increase their sensitivity at a minimal cost. For example, referring to FIG. 7, the described exemplary phase shifter may be incorporated into a receiving node 710 of a typical communication system 700 for receiving and processing radio frequency signals 705 from a transmit node 702 that transmits the transmitted RF signals. In addition, the described exemplary phase shifter and/or another phase shifter of the present invention may be incorporated into the transmit node 702.

Figure 8A:
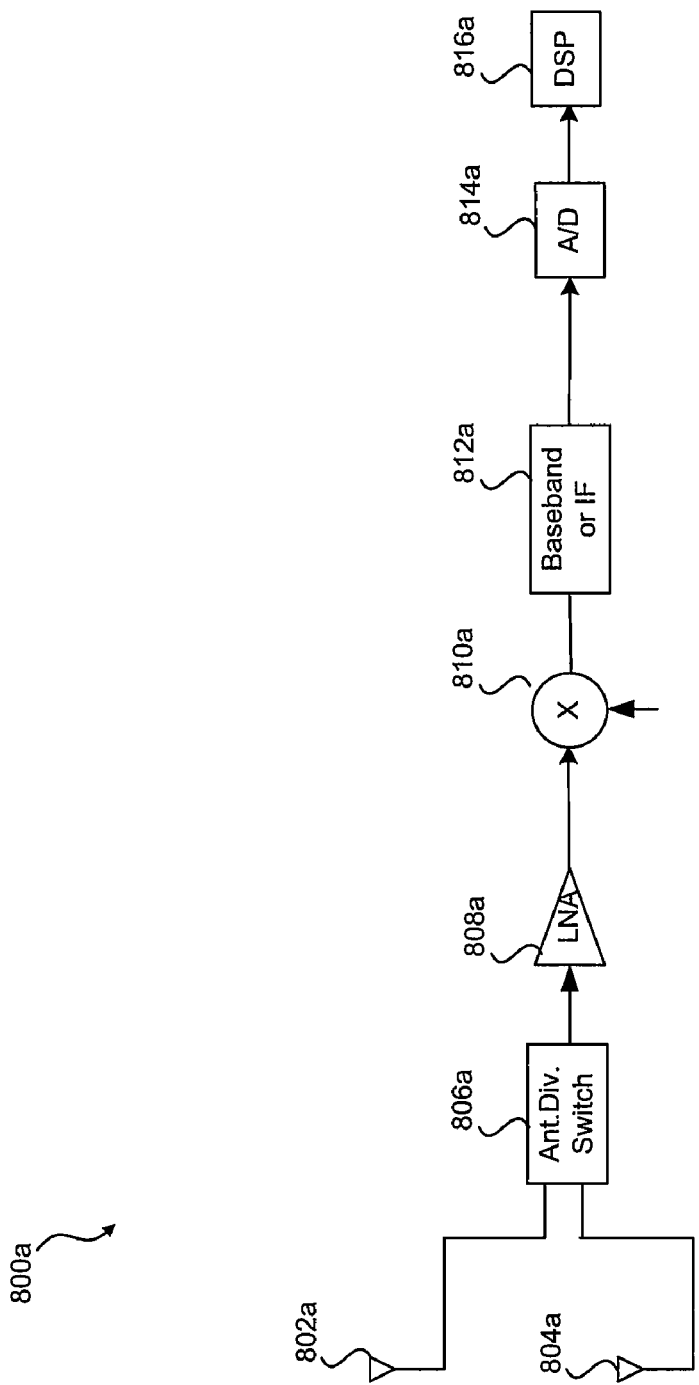
FIG. 8A illustrates a conventional receive node using an antenna diversity switch.

FIG. 8A illustrates a conventional receive node using an antenna diversity switch. Referring to FIG. 8A, the conventional receive node 800a may comprise antennas 802a, 804a, an antenna diversity switch 806a, and a low noise amplifier (LNA) 808a. The conventional receive node may also comprise a frequency mixer 810a, an intermediate processing stage 812a, an analog-to-digital (A/D) converter 814a, and a digital signal processor 816a.

The intermediate processing stage 812a may comprise a baseband processor and or a filter for filtering the mixed signal received from the mixer 810a. The antenna diversity switch 806a may be used to switch between the two receive antennas 802a, 804a, and select a signal for processing.

In one embodiment of the invention, the receiver node 800a may be further improved by eliminating the antenna diversity switch 806a and using one or more phase shifters for diversity selection.

Figure 7:
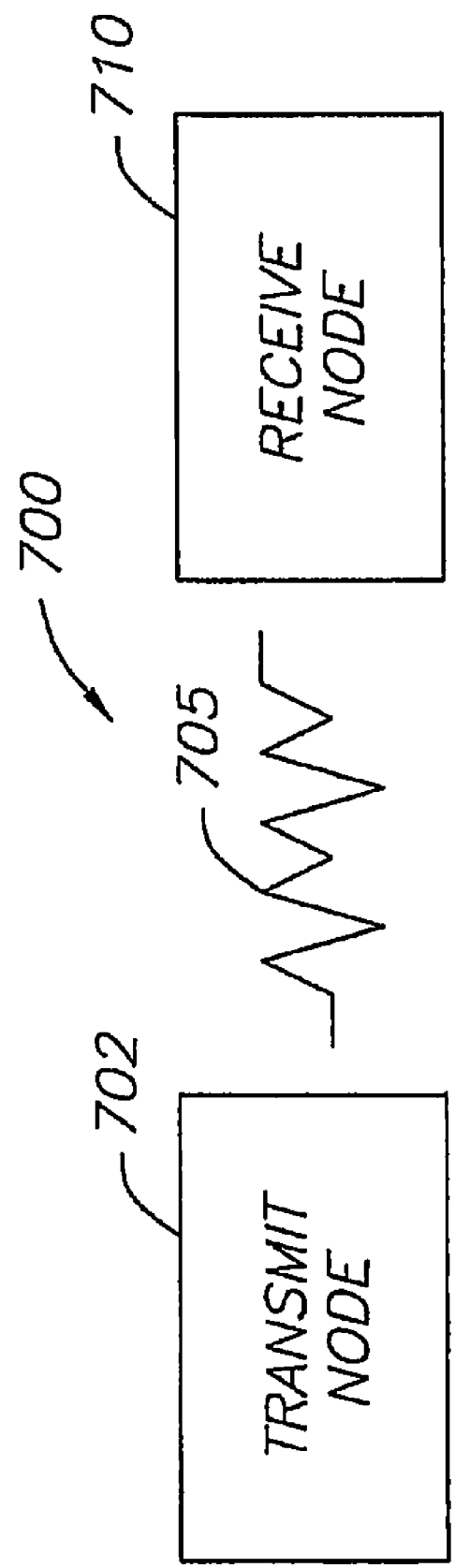
FIG. 7 illustrates a communication system having a transmit node and a receive node.
Figure 8B:
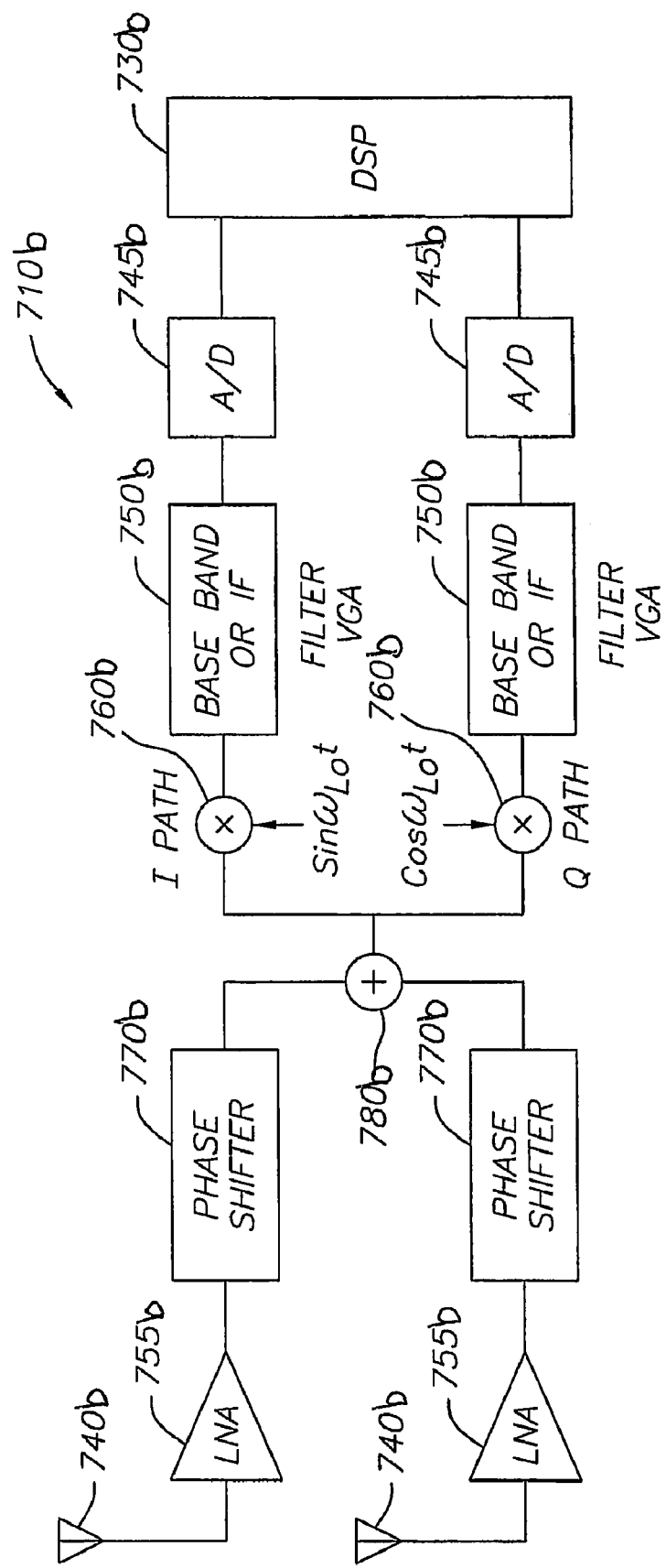
FIG. 8B illustrates the receive node of FIG. 7 using phase shifters, in accordance with an embodiment of the invention.

FIG. 8B illustrates the receive node of FIG. 7 using phase shifters, in accordance with an embodiment of the invention. Referring to FIG. 8B, the receive node 710b may comprise phase shifters 770b (e.g., as illustrated in FIGS. 1, 2, 3, 4, 5 and/or 6), low noise amplifiers (LNAs) 755b, frequency mixers 760b, intermediate processing stages 750b, a digital signal processor, or a communications controller (DSP) 730b, a combiner 780b, and antennas 740b. In one embodiment of the invention, the digital signal processor 730b may be operating in accordance with one or more standards, including but not limited to, IEEE 802.11, Bluetooth, advanced mobile phone services (AMPS), global systems for mobile communications (GSM), code division multiple access (CDMA), local multi-point distribution systems (LMDS), multi-channel multi-point distribution systems (MMDS), and/or variations thereof. In another embodiment of the invention, the digital signal processor 730b may be coupled to the phase shifters 770b and may comprise an integrated digital controller with multiple inputs and outputs, such as a transmit data output and a receive data input.

In the illustrated receiver node 710b, each of the phase shifters 770b is coupled to a corresponding one of the antennas 740b. In one embodiment, each of the phase shifters 770b may provide 0 to 360 degrees of phase shifts to the received signals.

In FIG. 8B, the phase shifters 770b are shown to be coupled to the adder 780b. The adder 780b is then coupled to the frequency mixers 760b and then to the intermediate processing stages 750b. One of the frequency mixers 760b may comprise an I path mixer (or for mixing a sine waveform) and another one of the frequency mixers 760b may comprise a Q path mixer (or for mixing a cosine waveform). Each of the intermediate processing stages 750b may comprise a filter and/or a variable gain amplifier (VGA).

In an exemplary operation of the illustrated receiver node 710b of FIG. 8B, the phase shifters 770b receive inbound RF signals from the antennas 740*b* via respective one of the low noise amplifiers (LNAs) 755*b* coupled between the antennas 740*b* and the phase shifters 770*b*. Each of the phase shifters 770*b* then respectively phase shifts the RF signals. The phase-shifted RF signals are then combined by the adder 780*b* into combine-phase-shifted RF signals (e.g., having a first 0 to 360 degrees of phase shifts and a second 0 to 360 degree of phase shifts).

The frequency mixers 760*b* then respectively mix the combined RF signals into a first mixed signals (e.g., having a sine waveform) and a second mixed signals (e.g., having a cosine waveform). The intermediate processing stages 750*b* then preliminarily process the first and second mixed signals, respectively (e.g., by filtering and/or amplifying the signals) to produce preliminarily processed signals. The digital signal processor (or communications controller) 730*b* may then recover and/or further process the raw data from the preliminarily processed signals in accordance with the particular communications standard in use.

In view of the forgoing, an exemplary embodiment of the present invention provides an RF phase shifter. The RF phase shifter may comprise a transconductor, a 90 degrees phase shifting circuit, a gain controller, and/or an adder. The transconductor produces first and second currents from an input voltage. The 90 degrees phase shifting circuit is coupled to the transconductor and generates 90 degree phase shift between these two currents. The gain controller is providing a first gain to the first current and a second gain to the second current. The adder is coupled to the first and second parts of the 90 degrees phase shifting circuit and adds the first current with the second current, where the two currents may have 90 degrees phase difference and may have different amplitudes. In this exemplary RF phase shifter, when the gain controller is turned off, the 90 degrees phase shifting circuit provides the first current and the second current with a phase angle of 90 degrees with respective to each other and/or with equal amplitudes and the adder then adds the first current and the second current to generate an output current having a phase angle of 45 degrees with respective to the first current; and, when the gain controller is turned on, the gain controller provides the first gain and the second gain to the first and second currents to vary the amplitudes of the first and/or second currents and/or to vary the phase angle of the output current with respect to the first current.

In one exemplary embodiment of the present invention, an RF phase shifter may comprise a first capacitor, a first resistor, a second resistor, a second capacitor, at least one input node, at least one output node, a first gain controller, and a second gain controller. The first capacitor has a first capacitor node and a second capacitor node. The first resistor is coupled between the first capacitor node and a ground. The second resistor has a first resistor node and a second resistor node. The second capacitor is coupled between the first resistor node and the ground. The at least one input node is coupled to the first capacitor node and the first resistor node. The at least one output node is coupled to the second capacitor node and the second resistor node. The first gain controller is coupled to the first capacitor node, and the second gain controller is coupled to the first resistor node. In this exemplary embodiment, the first capacitor and the first resistor and the second resistor and the second capacitor provide first and second signals with 90 degrees different in phase angle; the first gain controller provides a first gain to the first signal and the second gain controller provides a second gain to the second signal; and the at least one output node adds the first signal with the second signal to provide a third signal having a desired phase angle with respect to the first signal. The desired phase angle can range from about 0 to 360 degrees with respect to the first signal.

In one exemplary embodiment of the present invention, an RF communication system includes a transmit node for transmitting RF signals and a receive node having a plurality of antennas for receiving the RF signals. The receive node has a plurality of phase shifters, each of the phase shifters coupling a respective one of the antennas and having a transconductor, a 90 degrees phase shifting circuit, a gain controller, and an adder. The transconductor produces first and second currents from an input voltage. The 90 degrees phase shifting circuit is coupled to the transconductor and has first and second circuit portions for providing the first and second currents with a 90 degrees difference in phase angle. The gain controller is for providing a first gain to the first current and a second gain to the second current. The adder is coupled to the first and second parts of the 90 degrees phase shifting circuit and adds the first and second current. In this exemplary embodiment, when the gain controller is turned off, the 90 degrees phase shifting circuit provides the first current and the second current with a phase angle of 90 degrees with respect to each other; and, when the gain controller is turned on, the gain controller provides the first gain and the second gain to the 90 degrees phase shifting circuit to vary the amplitude of the first current and/or the amplitude of the second current and the adder adds the first and second currents with the varied amplitude(s) to generate an output current with a desired phase angle with respect to the first current.

In one embodiment of the invention, the receiver node 710*b* may receive a plurality of wireless signals via the receive antennas 740*b*. Each of M phase shifters 770*b* coupled to each of the M receive antennas 740*b* may be set to operate in a bypass mode or with an arbitrary phase setting. Corresponding signal strengths of M signals generated when each of the M phase-shifters 770*b* is coupled to each of the M receive antennas 740*b* may be measured, while at least a portion of the M receive antennas 740*b* are turned off. Selecting one of the M generated signals for processing without the use of an antenna switch, based on the measured signal strength.

Each of the plurality of received wireless signals may be amplified by the LNAs 755*b* prior to the measuring. An in-phase (I) component and/or a quadrature (Q) component may be generated for each of the M generated signals using the frequency mixers 760*b*. Each of the generated in-phase (I) component and/or the quadrature (Q) component for each of the M generated signals may be filtered by the baseband/IF stages 750*b* to obtain filtered signals. Each of the filtered signals may be analog-to-digital converted by the A/D converters 745*b* to generate digital signals. A signal strength of each of the filtered signals may be measured, for example, by a signal strength measuring block or other suitable circuit (not pictured). One of the filtered signals may then be selected for processing by the DSP 730*b* by turning off the other paths without the use of an antenna switch, based on the measured signal strength of each of the filtered signals.

Figure 8C:
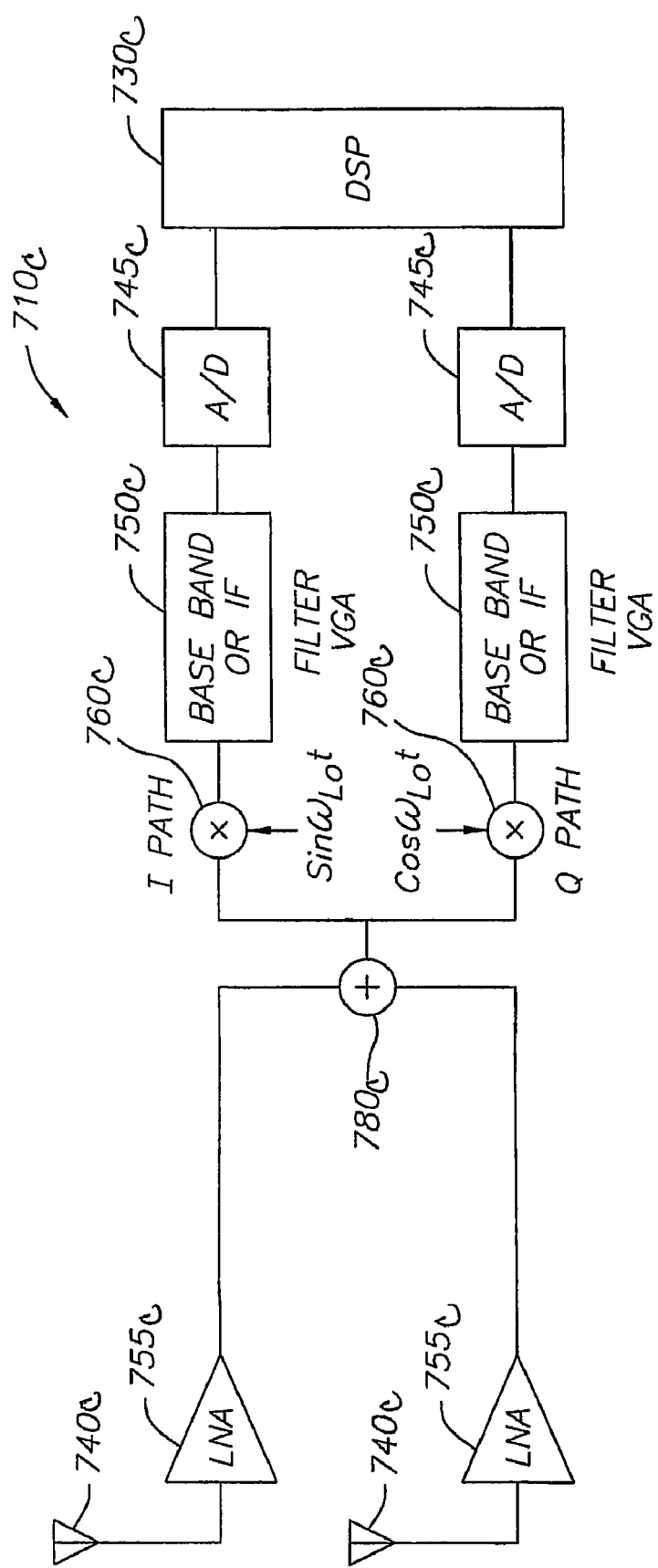
FIG. 8C illustrates the receive node of FIG. 7 without the use of phase shifters, in accordance with an embodiment of the invention.

FIG. 8C illustrates the receive node of FIG. 7 without the use of phase shifters, in accordance with an embodiment of the invention. Referring to FIG. 8C, the receiver node 710*c* may use the same circuits as the receiver node 710*b* of FIG. 8B. However, to further simplify the receiver node 710*b*, the phase-shifters 770*b* have been removed in the embodiment 710*c* in FIG. 8C.

A plurality of wireless signals may be received by the receiver node 710*c* via the receive antennas 740*c*. Each of the plurality of wireless signals received via the receive antennas 740*c* may be amplified by the LNAs 755*c* to generate amplified signals. A signal strength of each of the generated amplified signals may be measured by a signal strength measuring block while the other amplifiers are turned off or while at least a portion of the receive antennas 740c are turned off. The signal strength measuring block (not pictured in FIG. 8C) may be located anywhere along the signal processing path, after the LNAs 755c. For example, a signal strength measuring block may be located after the baseband/IF processing stages 750c for measuring signal strength.

One of the amplified signals may be selected for processing by the DSP 730c by turning off at least a portion of the remaining other receive paths without the use of an antenna switch, based on the measured signal strength of each of the amplified signals. The frequency mixers 760c may generate an in-phase (I) component and/or a quadrature (Q) component for each of the amplified signals. Each of the generated in-phase (I) component and/or the quadrature (Q) component for each of the amplified signals may be filtered by the baseband/IF blocks 750c to obtain filtered signals. The A/D converters 745c may analog-to-digital convert each of the filtered signals to generate digital signals. Signal strength of each of the filtered signals may be measured, for example, after the baseband/IF blocks 750c. One of the filtered signals may be selected by turning off the other paths for processing by the DSP 730c without the use of an antenna switch, based on the measured signal strength of each of the M filtered signals.

In one embodiment of the invention, a method for processing signals in the receiver 710c may comprise receiving a plurality of wireless signals via a plurality of M receive antennas 740c. Each of the plurality of wireless signals received via the plurality of M receive antennas 740c may be amplified using the LNAs 755c to generate M amplified signals. At least two measurements of signal strength of the M amplified signals may be made, while turning off at least a portion of said plurality of M receive antennas. For example the at least two measurements may be performed while N receive antennas, selected from the M receive antennas 740c, are turned off, where N is smaller than M. At least one of the M amplified signals may be selected for processing by the DSP 730c without the use of an antenna switch, based on the at least two measurements of signal strength.

In yet another embodiment of the invention, a system for processing signals in the receiver 710c may comprise one or more receiver processing circuits that enable receiving of a plurality of wireless signals via a plurality of M receive antennas 740c. The one or more receiver processing circuits may enable amplification of each of the plurality of wireless signals received via the plurality of M receive antennas 740c to generate M amplified signals. The one or more receiver processing circuits may enable making at least two measurements of signal strength of the M amplified signals, while turning off at least a portion of said plurality of M receive antennas. For example the at least two measurements may be performed while N receive antennas, selected from the M receive antennas 740c, are turned off, where N is smaller than M. The one or more receiver processing circuits may enable selection of at least one of the M amplified signals for processing by the DSP 730c without the use of an antenna switch, based on the at least two measurements of signal strength.

Figure 8D:
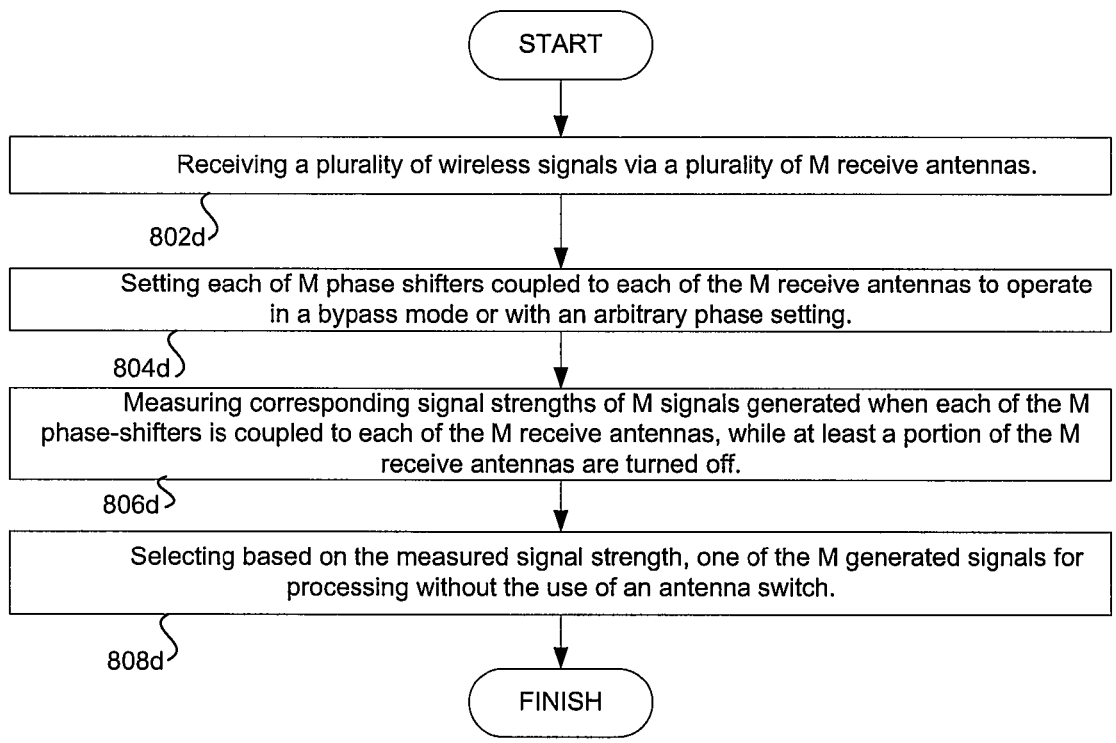
FIG. 8D illustrates exemplary steps for processing signals within a receiver, in accordance with an embodiment of the invention.

FIG. 8D illustrates exemplary steps for processing signals within a receiver, in accordance with an embodiment of the invention. Referring to FIGS. 8B and 8D, at 802d, a plurality of wireless signals may be received via the receive antennas 740b. At 804d, each of M phase shifters coupled to each of the M receive antennas may be set to operate in a bypass mode or with an arbitrary phase setting. At 806d, corresponding signal strengths of M signals generated when each of the M phase-shifters is coupled to each of the M receive antennas may be measured, while at least a portion of the M receive antennas are turned off. At 808d, one of the M generated signals may be selected for processing without the use of an antenna switch, based on the measured signal strength.

Figure 8E:
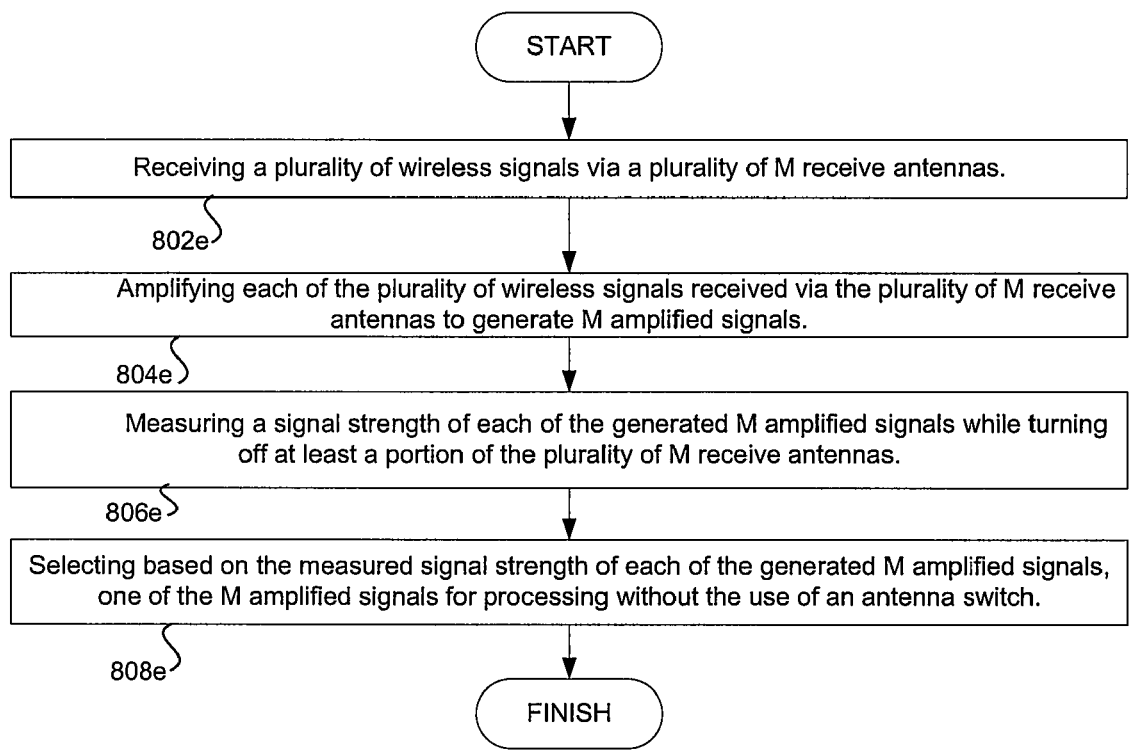
FIG. 8E illustrates exemplary steps for processing signals within a receiver, in accordance with an embodiment of the invention.

FIG. 8E illustrates exemplary steps for processing signals within a receiver, in accordance with an embodiment of the invention. Referring to FIGS. 8C and 8E, at 802e, a plurality of wireless signals may be received via the receive antennas 740c. At 804e, the LNAs 755c may amplify each of the plurality of wireless signals received via the receive antennas 740c to generate amplified signals. At 806e, signal strength of each of the amplified signals may be measured along the signal processing path within the receiver node 710c while at least a portion of the remaining amplifiers (LNAs) are turned off or at least a portion of the receive antennas 740c are turned off. At 808e, the DSP 730c may select one of the amplified signals for processing without the use of an antenna switch by turning off the other paths, based on the measured signal strength of each of the generated M amplified signals.

Certain embodiments of the invention may comprise a machine-readable storage having stored thereon, a computer program having at least one code section for processing signals in a receiver, the at least one code section being executable by a machine for causing the machine to perform one or more of the steps described herein.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a receiver, the method comprising:

receiving a plurality of wireless signals via a plurality of M receive antennas coupled to M corresponding signal amplifiers;

setting each of M phase shifters coupled to each of said M receive antennas to operate in a bypass mode or with an arbitrary phase setting;

measuring corresponding signal strengths of M signals generated when each of said M phase-shifters is coupled to each of said M receive antennas, while at least a portion of said M signal amplifiers are turned off; and selecting based on said measured signal strength, one of said M generated signals for processing without the use of an antenna switch.

2. The method according to claim 1, comprising amplifying each of said plurality of received wireless signals prior to said measuring.

3. The method according to claim 1, comprising generating one or both of an in-phase (I) component and/or a quadrature (Q) component for each of said M generated signals.

4. The method according to claim 3, comprising filtering each of said generated one or both of said in-phase (I) component and/or said quadrature (Q) component for each of said M generated signals to obtain M filtered signals.

5. The method according to claim 4, comprising analog-to-digital converting each of said M filtered signals to generate M digital signals.

6. The method according to claim 4, comprising measuring a signal strength of each of said M filtered signals.

7. The method according to claim 6, comprising selecting based on said measured signal strength of each of said M filtered signals, one of said M filtered signals for processing without the use of an antenna switch.

8. A system for processing signals in a receiver, the system comprising:

one or more receiver processing circuits that enables receiving of a plurality of wireless signals via a plurality of M receive antennas coupled to M corresponding signal amplifiers;

said one or more receiver processing circuits enables setting of each of M phase shifters coupled to each of said M receive antennas to operate in a bypass mode or with an arbitrary phase setting;

said one or more receiver processing circuits enables measuring of corresponding signal strengths of M signals generated when each of said M phase-shifters is coupled to each of said M receive antennas, while at least a portion of said M signal amplifiers are turned off; and said one or more receiver processing circuits enables selecting based on said measured signal strength, of one of said M generated signals for processing without the use of an antenna switch.

9. The system according to claim 8, wherein said one or more receiver processing circuits enables amplification of each of said plurality of received wireless signals prior to said measuring.

10. The system according to claim 8, wherein said one or more receiver processing circuits enables generation of one or both of an in-phase (I) component and/or a quadrature (Q) component for each of said M generated signals.

11. The system according to claim 10, wherein said one or more receiver processing circuits enables filtering of each of said generated one or both of said in-phase (I) component and/or said quadrature (Q) component for each of said M generated signals to obtain M filtered signals.

12. The system according to claim 11, wherein said one or more receiver processing circuits enables analog-to-digital converting of each of said M filtered signals to generate M digital signals.

13. The system according to claim 11, wherein said one or more receiver processing circuits enables measuring of a signal strength of each of said M filtered signals.

14. The system according to claim 13, wherein said one or more receiver processing circuits enables selecting based on said measured signal strength of each of said M filtered signals, one of said M filtered signals for processing without the use of an antenna switch.

15. A method for processing signals in a receiver, the method comprising:

receiving a plurality of wireless signals via a plurality of M receive antennas coupled to M corresponding signal amplifiers;

amplifying each of said plurality of wireless signals received via said plurality of M receive antennas to generate M amplified signals;

measuring a signal strength of each of said generated M amplified signals while turning off at least a portion of said plurality of M signal amplifiers; and selecting based on said measured signal strength of each of said generated M amplified signals, one of said M amplified signals for processing without the use of an antenna switch.

16. The method according to claim 15, comprising generating one or both of an in-phase (I) component and/or a quadrature (Q) component for each of said M amplified signals.

17. The method according to claim 16, comprising filtering each of said generated one or both of said in-phase (I) component and/or said quadrature (Q) component for each of said M amplified signals to obtain M filtered signals.

18. The method according to claim 17, comprising analog-to-digital converting each of said M filtered signals to generate M digital signals.

19. The method according to claim 17, comprising measuring a signal strength of each of said M filtered signals.

20. The method according to claim 19, comprising selecting based on said measured signal strength of each of said M filtered signals, one of said M filtered signals for processing without the use of an antenna switch.

21. A system for processing signals in a receiver, the system comprising:

one or more receiver processing circuits that enables receiving of a plurality of wireless signals via a plurality of M receive antennas coupled to M corresponding signal amplifiers;

said one or more receiver processing circuits enables amplifying of each of said plurality of wireless signals received via said plurality of M receive antennas to generate M amplified signals;

said one or more receiver processing circuits enables measuring of a signal strength of each of said generated M amplified signals, while turning off at least a portion of said plurality of M signal amplifiers; and said one or more receiver processing circuits enables selecting based on said measured signal strength of each of said generated M amplified signals, one of said M amplified signals for processing without the use of an antenna switch.

22. The system according to claim 21, wherein said one or more receiver processing circuits enables generation of one or both of an in-phase (I) component and/or a quadrature (Q) component for each of said M amplified signals.

23. The system according to claim 22, wherein said one or more receiver processing circuits enables filtering of each of said generated one or both of said in-phase (I) component and/or said quadrature (Q) component for each of said M amplified signals to obtain M filtered signals.

24. The system according to claim 23, wherein said one or more receiver processing circuits enables analog-to-digital conversion of each of said M filtered signals to generate M digital signals.

25. The system according to claim 23, wherein said one or more receiver processing circuits enables measuring of a signal strength of each of said M filtered signals.

26. The system according to claim 25, wherein said one or more receiver processing circuits enables selecting based on said measured signal strength of each of said M filtered signals, one of said M filtered signals for processing without the use of an antenna switch.

27. A method for processing signals in a receiver, the method comprising:

receiving a plurality of wireless signals via a plurality of M receive antennas coupled to M corresponding signal amplifiers;

amplifying each of said plurality of wireless signals received via said plurality of M receive antennas to generate M amplified signals;

making at least two measurements of a signal strength while turning off at least a portion of said plurality of M signal amplifiers; and selecting based on said at least two measurements of said signal strength, at least one of said M amplified signals for processing without the use of an antenna switch.

28. A system for processing signals in a receiver, the system comprising:

one or more receiver processing circuits that enables receiving of a plurality of wireless signals via a plurality of M receive antennas coupled to M corresponding signal amplifiers;

said one or more receiver processing circuits enables amplifying of each of said plurality of wireless signals received via said plurality of M receive antennas to generate M amplified signals;

said one or more receiver processing circuits enables making at least two measurements of a signal strength while turning off at least a portion of said plurality of M signal amplifiers; and said one or more receiver processing circuits enables selecting based on said at least two measurements, at least one of said M amplified signals for processing without the use of an antenna switch.

* * * * *